(12) United States Patent
Hermann et al.

(10) Patent No.: US 9,150,437 B2
(45) Date of Patent: Oct. 6, 2015

(54) DROP-IN CELL FOR ELECTROLYTIC PURIFICATION OF WATER

(75) Inventors: Robert Hermann, Oberaich (AT); Michael Schelch, Oberaich (AT); Wolfgang Staber, Bruck an der Mur (AT); Wolfgang Wesner, Vienna (AT)

(73) Assignee: PRO AQUA DIAMANTELEKTRODEN PRODUKTION GMBH & CO KG (AT)

( * ) Notice: Subject to any disclaimer, the term of this patent is extended or adjusted under 35 U.S.C. 154(b) by 449 days.

(21) Appl. No.: 13/538,500

(22) Filed: Jun. 29, 2012

(65) Prior Publication Data

US 2013/0001071 A1    Jan. 3, 2013

(30) Foreign Application Priority Data

Jun. 30, 2011    (AT) ..................................... 964/2011

(51) Int. Cl.
*C02F 1/467*    (2006.01)
*C02F 1/461*    (2006.01)
*C02F 103/42*    (2006.01)

(52) U.S. Cl.
CPC ..... *C02F 1/4672* (2013.01); *C02F 2001/46147* (2013.01); *C02F 2001/46171* (2013.01); *C02F 2103/42* (2013.01); *C02F 2201/46165* (2013.01); *C02F 2201/46195* (2013.01); *Y02W 10/37* (2013.01)

(58) Field of Classification Search
CPC ................... C02F 1/4672; C02F 2001/46147; C02F 2201/46165

USPC ......................................................... 204/271
See application file for complete search history.

(56) References Cited

U.S. PATENT DOCUMENTS

| 3,659,715 | A  | * | 5/1972  | Shaler et al. ............... 210/242.3 |
| 4,337,136 | A  |   | 6/1982  | Dahlgren |
| 4,630,634 | A  | * | 12/1986 | Sasaki et al. .................. 137/268 |
| 5,059,296 | A  | * | 10/1991 | Sherman .................... 204/229.8 |
| 5,085,753 | A  |   | 2/1992  | Sherman |
| 5,228,964 | A  |   | 7/1993  | Middleby |
| 6,508,929 | B1 | * | 1/2003  | Mercer .......................... 205/701 |
| 2002/0078990 | A1 | * | 6/2002 | Munk et al. .................. 136/244 |
| 2005/0067300 | A1 |   | 3/2005 | Tremblay |
| 2006/0151803 | A1 | * | 7/2006 | Wesner et al. ................ 257/103 |
| 2011/0010835 | A1 | * | 1/2011 | McCague .......................... 4/494 |
| 2011/0147203 | A1 | * | 6/2011 | Hermann et al. ............. 204/271 |

OTHER PUBLICATIONS

European Search Report dated Aug. 30, 2012 (Completed Aug. 22, 2012).
Austrian Search Report issued Jun. 18, 2012 in connection with Austrian Application No. A964/2011.
Office Action dated Dec. 7, 2012 in U.S. Appl. No. 12/967,544, containing provisional non-statutory double-patenting rejections of certain claims over claims in the present application.

* cited by examiner

*Primary Examiner* — Bryan D. Ripa
(74) *Attorney, Agent, or Firm* — Ostrolenk Faber LLP

(57) ABSTRACT

A drop-in cell for the electrolytic purification of water, for example bathwater or service water, with an electrolysis cell that can carry a flow of water, is built into an oblong, e.g., cylindrical, electrically insulating sheath or jacket, and has two contact electrodes mutually positioned a distance apart from each other. A float is situated at least at the one end region of the jacket.

16 Claims, 7 Drawing Sheets

DROP-IN CELL FOR ELECTROLYTIC PURIFICATION OF WATER

CROSS-REFERENCE TO RELATED APPLICATION

The present application claims benefit and priority of Austrian Patent Application No. A 964/2011 filed Jun. 30, 2011, incorporated herein in its entirety.

The invention relates to a drop-in cell for the electrolytic purification of water, for example bathwater or service water, with an electrolysis cell that can carry a flow of water, is built into an oblong, e.g., cylindrical, electrically insulating sheath or jacket, and has two contact electrodes mutually positioned a distance apart from each other.

The use of electrolysis cells to disinfect bathwater is known in the art. For example, EP-A-2 336 091 discloses a drop-in cell in which the electrodes assembled to form a roughly square electrolysis cell are imbedded into a jacket made of plastic or synthetic resin, and allow water to enter and exit. This drop-in cell is provided in particular for small pools, preferably for whirlpools, and is operated with a controller/regulator, which controls and regulates drop-in cell operation, so as to ensure an optimal disinfection of the water.

The consumption of valuable drinking water can be distinctly reduced through the use of service water, for example collected rainwater. Up to 30% of the water used in a household can be replaced with service or rainwater. In addition to the savings achieved by substituting rainwater for drinking water, the use of rainwater also tangibly relieves the burden placed on communal purification plants, in particular after major rains. Retaining a portion of the precipitation at rainwater collection facilities lowers the amount of wastewater entering the public sewer system. Overflow at purification plants is diminished, as are the associated stresses imposed by surface waters. Furthermore, the use of rainwater offers several advantages to the public sector and municipalities. Relieving the burden on drinking water reservoirs by substituting rainwater for valuable groundwater reduces the level of investment required for drinking water supply and the development of new groundwater resources. The process of catching precipitation in rainwater containers and storing it therein eases the strain placed on the sewer system, since there is less infiltration into the purification plants. This also makes it possible to impart smaller dimensions to the retention and compensating reservoirs at purification plants.

The quality of the service water/rainwater and its maintenance for specific timeframes plays an important role predominantly during warmer times of the year, and given prolonged periods that see little rainfall. Over time, the introduction of nutrients and microorganisms coupled with the multiplication thereof as water temperature rises causes the water to "tip". UV equipment or chemicals can be used to maintain a certain level of quality for the service water, wherein these are cost-intensive and require taking routine actions during use.

Therefore, the object of the invention is to design a drop-in cell in such a way that it can be used especially easily and without special attachment elements in water, whether it be water in a collection tank for rainwater or at bathing facilities.

The set object is achieved according to the invention by situating a float at least at the one end region of the jacket.

A drop-in cell designed according to the invention is simply positioned on the surface of the water. Since it floats or is suspended in the water, it migrates with the water level, and remains in an upright position, thereby ensuring a good flow through the electrolysis cell. Depending on the intended purpose, operation also requires no control electronics, in particular when used to purify service water or rainwater.

In a preferred embodiment of the invention, the drop-in cell has a self-contained power supply. As a result, it also no longer needs to have a cable that runs outside its jacket or housing. The drop-in cell can be powered by way of a solar cell or built-in or external battery pack. The solar cell can be secured to the top of the float. As an alternative, it is possible to hook up the drop-in cell to the power grid, but this requires an external cable. In one embodiment of the invention, both end regions of the jacket each exhibit one float, wherein these floats exhibit different buoyancy. In such an embodiment, the floating or suspended drop-in cell stabilizes itself especially well in the desired position running perpendicular to the surface of the water.

In a preferred embodiment of the invention, the at least one float is a constituent of the jacket, in particular molded onto the jacket. Floats that are shaped like mushroom heads or truncated cones or the like stabilize especially well. The float is preferably a hollow body filled with air and effectively sealed to the outside.

In order to ensure a good flow through the electrolysis cell, the jacket is provided with outlets above and below the electrolysis cell. These outlets can be provided in large numbers and given a very small design, thereby preventing the penetration of dirt.

The two faces of the electrolysis cell can have secured to them plugs, preferably made out of silicone, which are in contact with the interior of the jacket and exhibit outlets.

The electrolysis cell generates disinfectants directly from the water through electrochemical conversion. Depending on the intended purpose, it can now be sufficient for the electrolysis cell to exhibit only two contact electrodes; however, it can also be advantageous for the electrolysis cell to contain additional electrodes between the contact electrodes, in particular at least one bipolar diamond particle electrode.

The electrodes in the electrolysis cell are spaced apart from each other by spacers made out an electrically insulating material. The objective here is to ensure a compact design on the one hand, and a good flow through the electrolysis cell on the other. There is a range of advantageous ways in which to design or arrange the spacer(s) between the electrodes. For example, use can be made of spacers consisting of retention frames or retention frame sections, in which the longitudinal edges of the electrodes are inserted or held. Designing the spacers like a thin grid consisting of an electrically insulating material, such as plastic, is especially advantageous for the unimpeded flow of water. The spacer(s) can also consist of polymeric solid electrolyte material.

In embodiments where the spacer(s) do(es) not simultaneously hold the electrodes together in an electrode pack, the electrodes can be assembled along with the spacer(s) to yield the electrode pack by means of clamps, clips and the like, or with a locally applied adhesive.

The contact electrodes can also be designed in various ways. In particular, they can be designed as platelets coated with the electrode material, or as grids coated with the electrode material, in particular expanded metal grids. The latter configuration is especially advantageous for an unimpeded flow through the electrolysis cell.

Additional features, advantages and details of the invention will now be described in greater detail based on the schematic drawing, which presents exemplary embodiments. Shown on:

Figure 1:
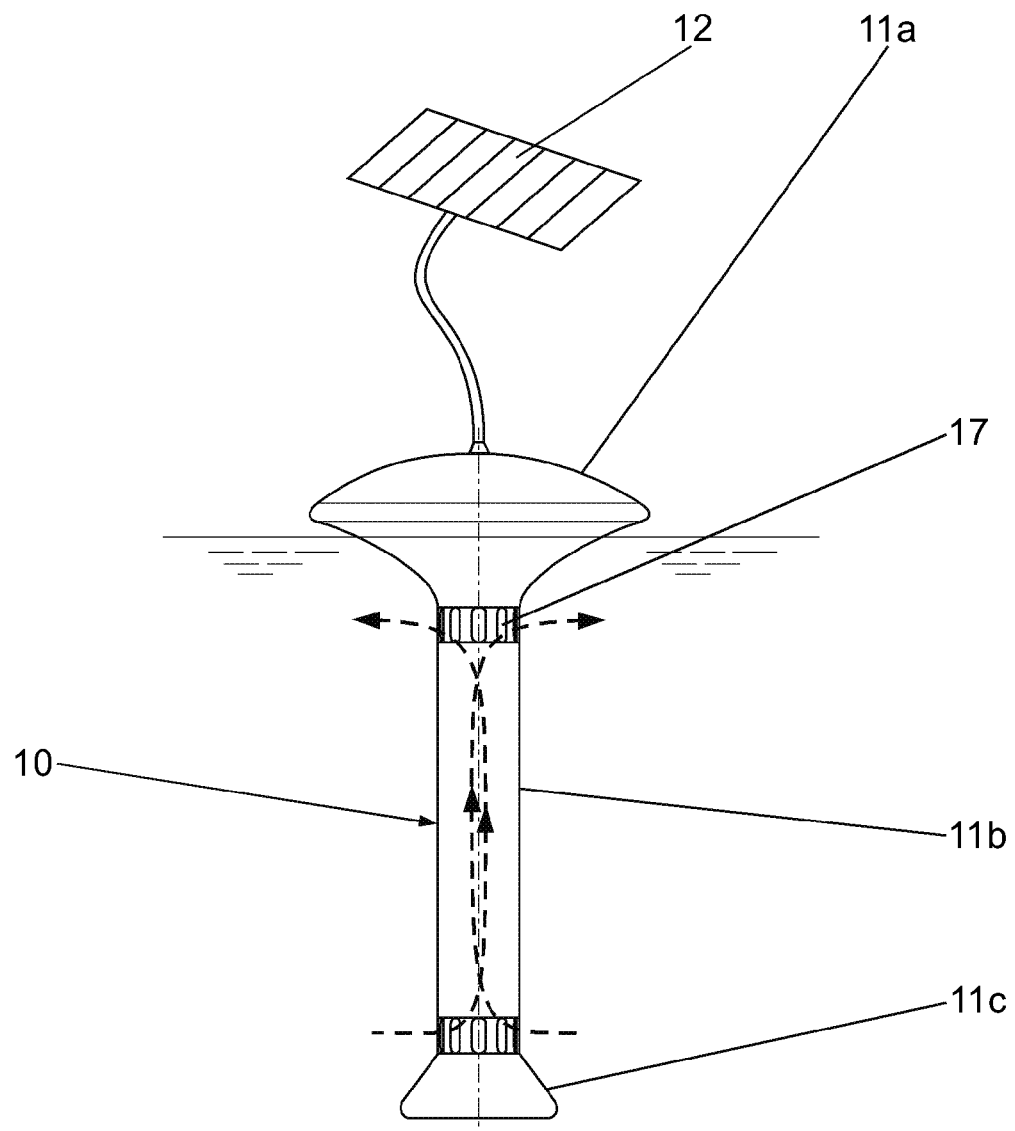
FIG. 1 is a view of the drop-in cell designed according to the invention.

FIG. 1 shows a drop-in cell for the electrolytic purification of water, in particular service water, such as rainwater collected in a container, or also of bathwater, in particular in small pools, like whirlpools. Therefore, the drop-in cell uses electrical power to generate a means for disinfection directly in the water through the electrochemical conversion of the water itself or introduced water contents. The conversion of these water contents yields oxygen and chlorine-based disinfectants.

The drop-in cell exhibits a float, can be used independently of water level and without a pump in the water, and is conceived in such a way that the water flows through an electrolysis cell 1, 1' in the drop-in cell during in-situ operation.

Figure 2A:
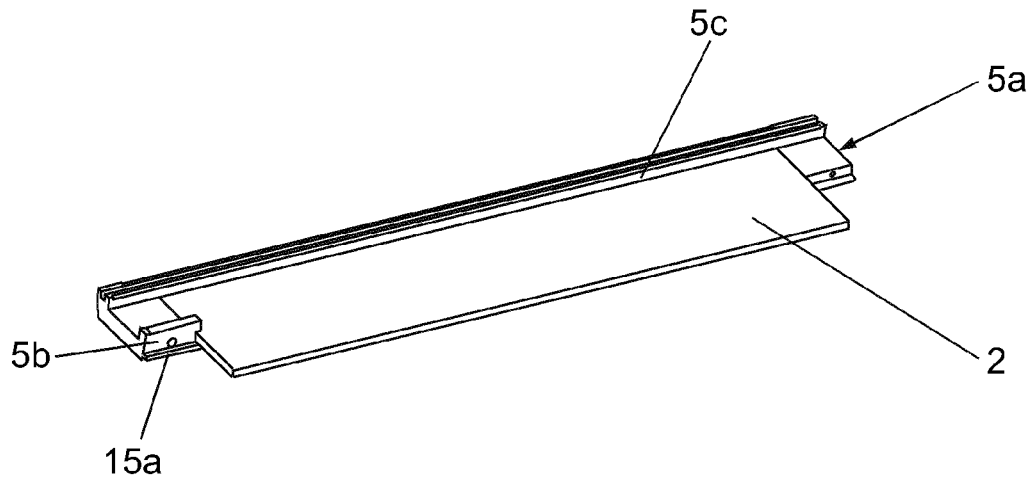
FIG. 2a to FIG. 2d are constituents of an embodiment of an electrolysis cell built into the interior of the drop-in cell.
Figure 2B:
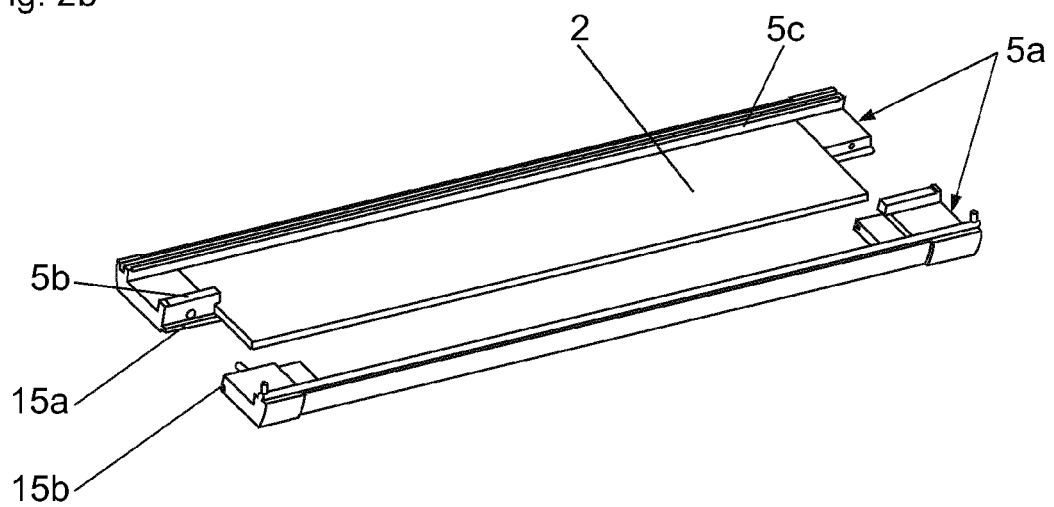
Figure 2C:
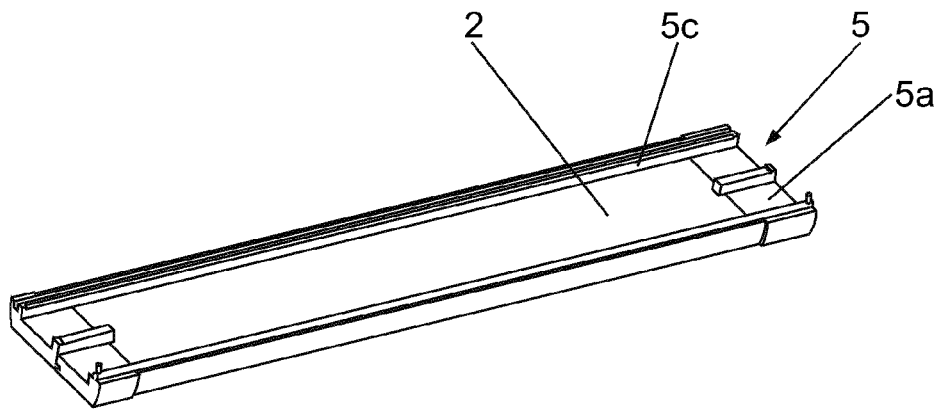
Figure 2D:
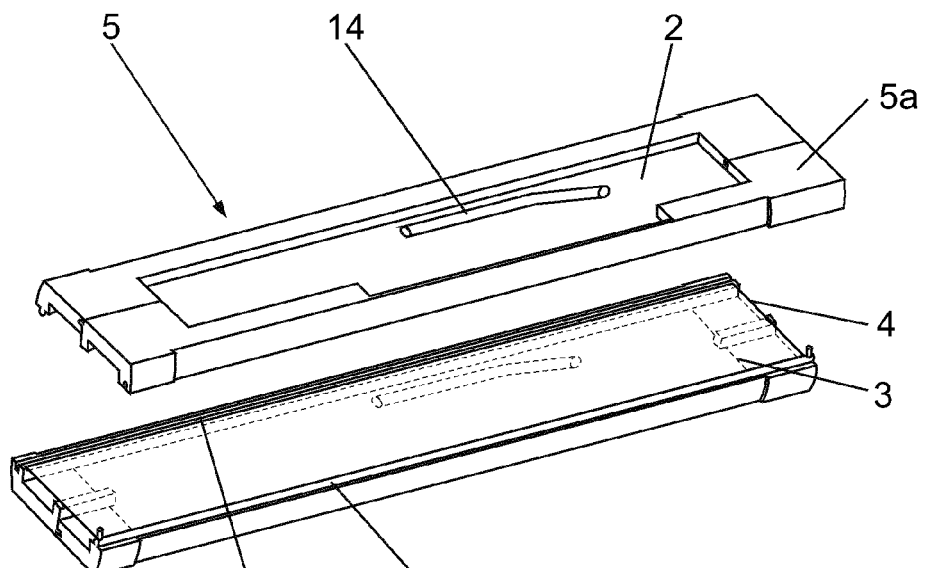
Figure 2E:
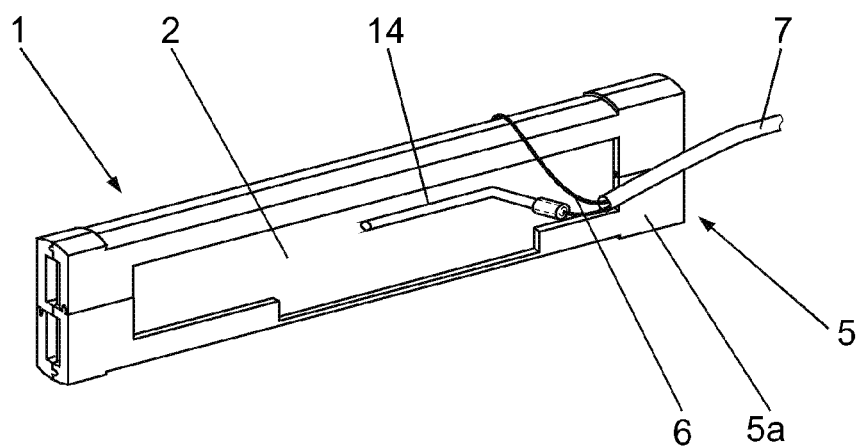

FIG. 2a to FIG. 2e show the design of an embodiment for an electrolysis cell 1 contained inside the drop-in cell. The electrolysis cell 1 exhibits two contact electrodes 2, 3 arranged parallel to each other (FIG. 2d), which are elongated, rectangular thin metal platelets. Situated between the contact electrodes 2, 3 and spaced apart from the latter is an also elongated, rectangular, bipolar diamond particle electrode 4 (FIG. 2d). Each contact electrode 2, 3 is placed in a two-part retention frame 5 made out of plastic. Each retention frame section 5a exhibits two narrow transverse parts and a long longitudinal part. A respective retaining collar 5b is formed on each transverse part of each retention frame section 5a, wherein the contact electrode 2 or 3 is inserted under the retaining collars 5b. The retaining collars 5b in conjunction with longitudinal webs 5c form spacers on the longitudinal parts of the retention frame sections 5a for the diamond particle electrode 4 inserted between the two retention frames 5, with the contact electrodes 2, 3 positioned. FIG. 2a shows one of the two retention frame sections 5a with a contact electrode 2 already inserted, while FIG. 2b also depicts the second retention frame section 5a, and FIG. 2c presents the retention frame sections 5a assembled by means of plug-in connectors 15a, 15b to yield a tongue-in-groove connection. FIG. 2d shows both contact electrodes 2, 3 in their retention frame 5, and the diamond particle electrode 4 placed on the one retention frame 5. FIG. 2e depicts the retention frame 5 assembled by means of additional plug-in connectors 15c, 15d to yield a tongue-in-groove connection. The diamond particle electrode 4 can additionally be adhesively bonded to the spacers, and to the upper sides of the retaining collars 5b and longitudinal webs 5c. The two contact electrodes 2, 3 can be commercially available electrodes, in particular consisting of iridium/ruthenium or platinum-coated titanium sheet, and can further be graphite electrodes or diamond electrodes.

Figure 3:
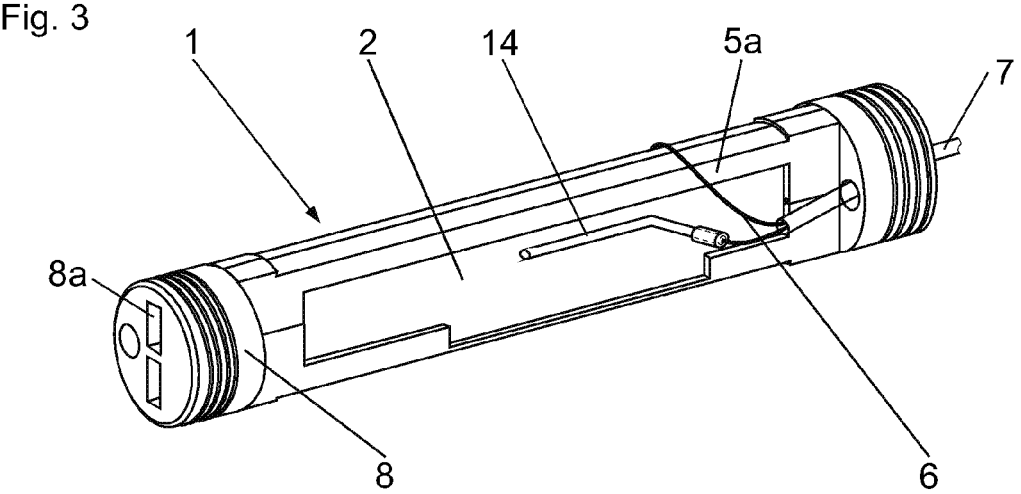
FIG. 3 is a view of the electrolysis cell made up of the constituents depicted on FIG. 2a to FIG. 2d, with the sealing plug positioned.
Figure 4:
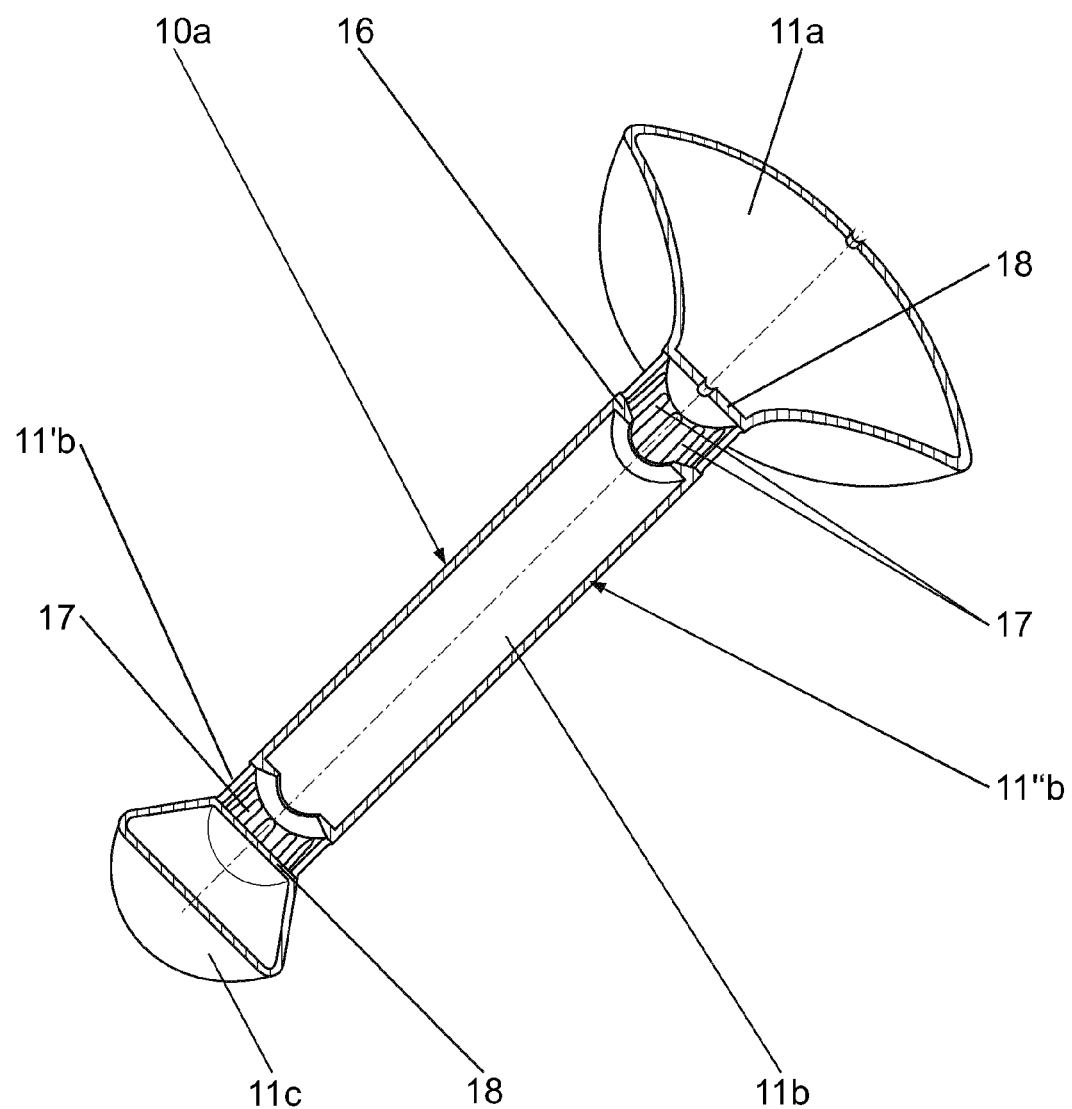
FIG. 4 is a view of a half shell of a jacket.
Figure 5:
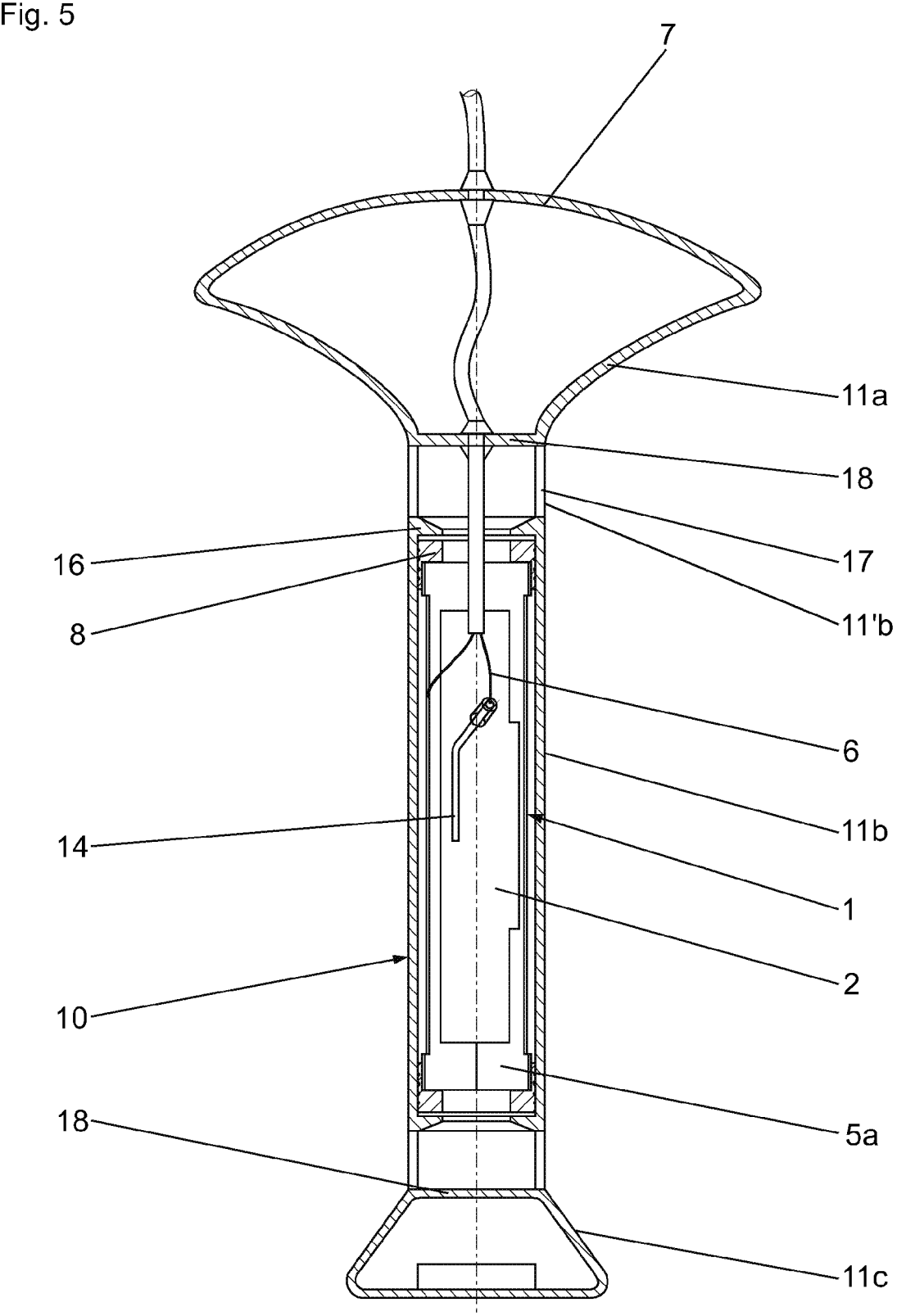
FIG. 5 is a longitudinal section through a drop-in cell designed according to the invention.

For example, the two contact electrodes 2, 3 are contacted by means of the titanium rods 14 denoted on FIGS. 2d and 2e, which are secured to the external sides of the contact electrodes 2, 3 in corresponding joining processes, such as welding, screwing or adhesive bonding. These titanium rods 14 are connected with electrical conductors 6, which are together routed out of the electrolysis cell 1 to the outside, e.g., in a single cable 7. The required insulation of the attachment points—between the cable 7 and titanium rods 14 and between the titanium rods 14 and contact electrodes 2, 3—can take the form of conventional shrink tubing, for example. The electrical conductors can further be secured directly to the contact electrodes 2, 3. As depicted on FIG. 3, plugs 8 consisting of a water-impermeable and effectively sealing material, for example silicone or a suitable plastic or plastic foam, are secured to the two longitudinal ends of the electrolysis cell 1 via insertion. The plugs 8 can be cylindrical in shape, and are provided with corresponding recesses for the electrolysis cell 1, along with outlets 8a, wherein the one plug 8 further exhibits an outlet for the cable 7. The electrolysis cell 1 along with the positioned plug 8 is incorporated into a jacket 10 comprised of two half shells 10a made out of plastic, which largely correspond with each other, and can be assembled by means of plug-in connectors (not shown). Each half shell 10a (FIG. 4) is formed in such a way as to interact with the second half shell 10a to yield in particular a mushroom head shaped or resembling head section 11a, an in particular cylindrical middle section 11b and a conically expanding base 11c resembling in particular a truncated cone. FIG. 4 only depicts a respective half of these constituents. The middle section 11b has a length somewhat greater than the length of the electrolysis cell 1 with the plug 8 inserted, and consists of a receiving section 11"b that incorporates the electrolysis cell 1 and two end sections 11'b. Retaining elements 16 formed inside the half shell 10a overlap the edges of the electrolysis cell 1, and hold it in the jacket 10.

The end sections 11'b of the middle section 11b are provided with a plurality of outlets 17, and separated from the head section 11a and base section 11c by separating walls 18. With the half shells 10a assembled, air-filled interior spaces into which no water can penetrate remain at least in the head section 11a, preferably also in the base section 11c, wherein the base section 11c exhibits a significantly smaller inner volume than the head section 11a. If necessary in conjunction with an adhesive, the plug-in connection between the half shells 10a ensures the required tightness. As an alternative, the joining edge of one of the half shells 10a can be spray-coated with a sealing material. In addition, the openings for routing through the cable 7 are incorporated in the separating wall 18 to the head section 11a and in the head section 11a. A corresponding seal is formed between the cable 7 and half shell(s) 10a here as well.

Figure 6:
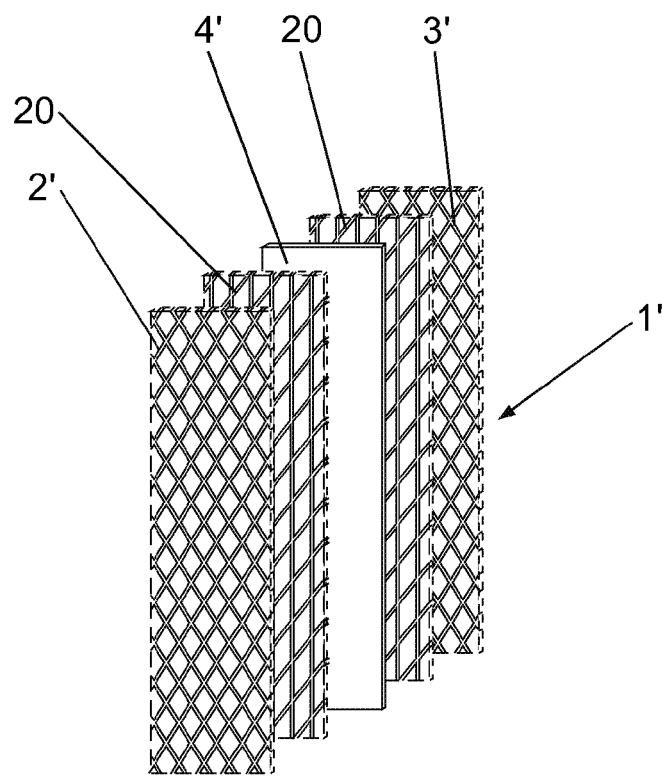
FIG. 6 shows constituents of another embodiment of an electrolysis cell.
Figure 7:
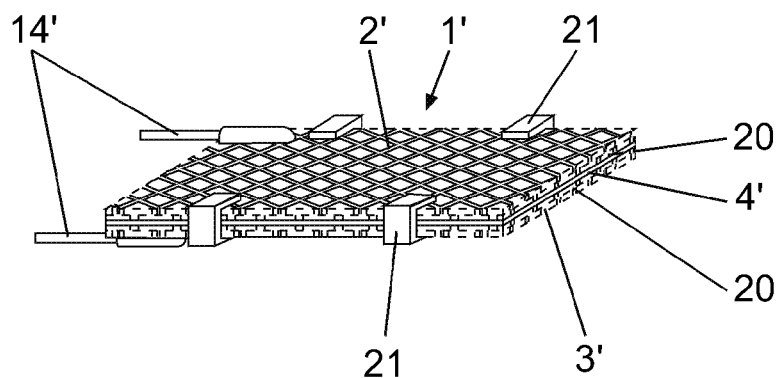
FIG. 7 and FIG. 8 are respective electrolysis cells put together with the parts depicted on FIG. 6.
Figure 8:
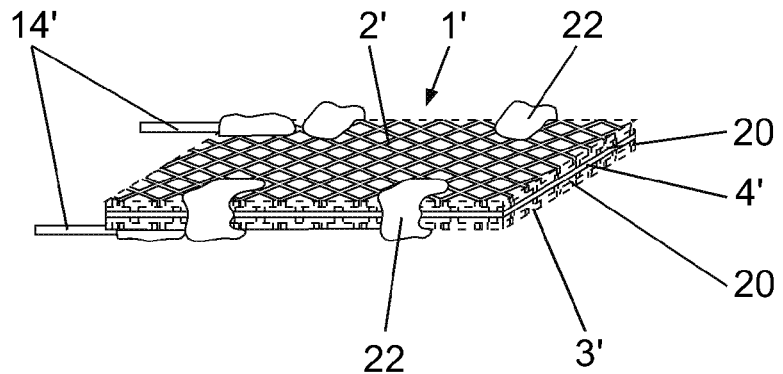

Another embodiment of the electrolysis cell 1' is depicted on FIG. 6 to FIG. 8. The electrolysis cell 1' exhibits two rectangular contact electrodes 2', 3', which are designed as grids, in particular as expanded metal grids, which are coated with the electrode material, in particular iridium/ruthenium, platinum or doped diamonds. Positioned between the contact electrodes 2', 3' is at least one bipolar, also rectangular diamond particle electrode 4', which is separated from the contact electrodes 2', 3' by spacers 20 made out of an electrically insulating material. The spacers 20 in the embodiment depicted are thin, preferably 0.5 mm to 2 mm thick plastic grids, which are adjusted in size to the size of the electrodes, and inserted between each contact electrode 2', 3' and the diamond particle electrode 4' in contact with the electrodes 2', 3', 4'. The spacers can further be polymeric solid electrolytes designed as thin platelets or films. Also possible are embodiments involving plastic clips or plastic strips, for example which can be secured to the longitudinal sides of the electrodes 2', 3', 4', and are provided with grooves or recesses that make it possible to introduce the longitudinal sides of the electrodes 2', 3', 4' and leave a slight gap between the electrodes 2' and 4' as well as 3' and 4'. In this case, the electrode pack is held together by the spacers.

As shown on FIG. 7, in one embodiment with plastic grids as the spacers 20, the electrode pack can be fixed in place on the longitudinal sides by clamps, clips 21 or the like made out of plastic or another electrically insulating material. As an alternative, the electrode pack can be fixed via locally and also laterally applied adhesives 22, as depicted on FIG. 8.

Figure 9:
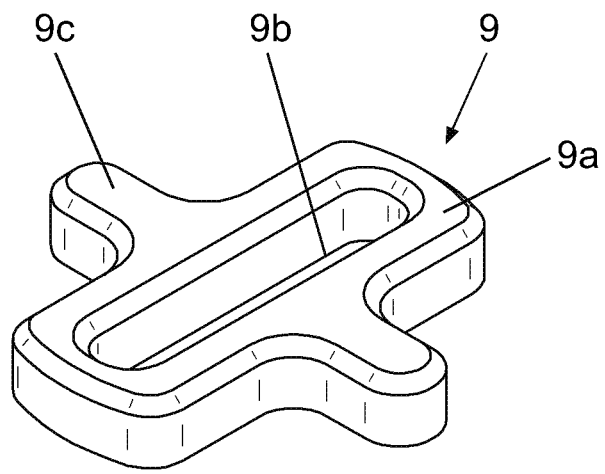
FIG. 9 is an embodiment of a retaining clamp.

FIG. 9 presents a preferred embodiment of a plastic adhesive clamp 9 for the electrode pack, wherein use is made in particular of two or more retention clamps 9. The retention clamps 9 exhibits an oblong like base section 9a with a central, oval opening 9b, through which the electrode pack is inserted and thereby held in the retention clamp 9. The central opening 9b is correspondingly dimensioned. Supporting sections 9c extend from the base section 9a, so that the retention clamps 19 can be braced against the interior wall of the jacket 10.

In order to contact the contact electrodes 2', 3', two titanium rods 14 are provided, which each are secured to the outside of a contact electrode 2', 3', for example by way of a welded bond.

Figure 10:
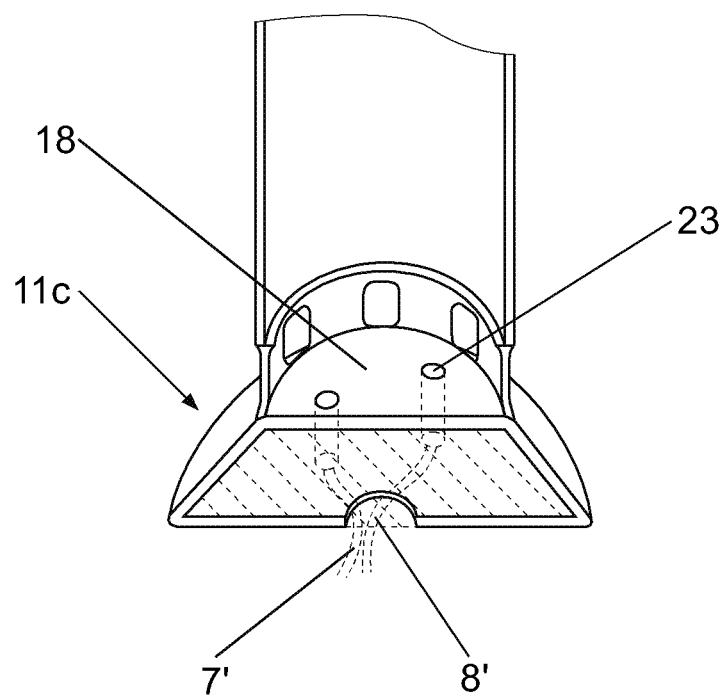
FIG. 10 is an embodiment of a base of the jacket.

The electrode packet is placed in the receiving section 11"b of the half shells 10a (FIG. 4). As depicted on FIG. 10 the titanium rods 14' can be inserted through holes 23 in the separating wall 18 of the base section 11c and connected with electrical conductors 8' in the hollow space of the base section 11c, for example which are routed to the outside in a cable 7'. In order to protect the contact sites against water, it is advantageous to fill the hollow space in the base section 11c, in particular with a hardening casting resin. However, it is also possible to run the titanium rods 14' into the head section 11a, and here establish the electrical connection in such a way as to create a corresponding seal.

The head section 11a molded onto the half shells 10a forms a float, and ensures that the drop-in cell floats on the surface of the water, in such a way that the electrolysis cell 1 in the drop-in cell becomes completely immersed in the water. The base section 11c can also form a float, and stabilizes the position of the drop-in cell in the water. When the container is empty, it ensures that the outlets are not displaced by dirt on the floor of the container. Depending on the design/buoyancy of the float(s), the drop-in cell can also float in the water.

In a preferred embodiment of the invention, the electrolysis cell 1, 1' is supplied with power by means of a commercially available solar cell 12, which is hooked up to the cable 7, 7' and has a bracket (not shown) that can be used to clip or screw the solar cell 12 onto the upper edge of the container, for example. The solar cell can also be secured to the outer surface of the float. As an alternative to the solar cell 12, the base section 11c of the jacket 10 can incorporate a battery pack with replaceable batteries, for example. In this embodiment variant, the cable 7, 7' is introduced into the interior of the base section 10c, and a sealed opening flap is provided in the base section 11c. Other embodiments can provide an external battery/accumulator pack or a power supply unit to be connected to the power grid.

The bipolar diamond particle electrode 4, 4' can be a diamond particle electrode designed according to WO-A-2007116004. These known diamond particle electrodes consist of synthetically manufactured and electrically conductive diamond particles, which are embedded in a single layer into a carrier layer consisting of plastic, and exposed on both sides of the carrier layer.

When using the drop-in cell in collected rainwater, which generally contains only a very small percentage of lime, it is not necessary to reverse the polarity. However, an automatic polarity reversal unit can be provided, with a polarity reversal only being required after a considerable time, in particular after several hours. The drop-in cell can further be provided with a controller/regulator.

If the drop-in cell is hooked up directly to a solar cell 12, it usually operates in daylight or between sunrise and sunset.

The electrolysis cell 1, 1' can further exhibit only two contact electrodes, which are preferably diamond electrodes. In addition, several bipolar diamond electrodes, preferably diamond particle electrodes, can be arranged in parallel. It is further possible to design the electrolysis cell according to the European patent application with publication number EP 2336091 A1, and thus embed the electrolysis cell on the outside into a plastic or synthetic resin jacket. In order to fabricate this embedding or jacket, the completely ready-made electrolysis cell is introduced into a casting mold, and a 2-component synthetic resin, e.g., a polyester resin or epoxy resin, is compounded and poured in. After the resin has hardened, the drop-in cell is removed from the casting mold, and lids (not shown) along with a separate heat section as the float and possibly a base section as well are joined with the jacket on the front sides. The head and base section can exhibit segments with outlets.

The flow through the drop-in cell is supported or enabled by the rising gas bubbles, which arise at the electrodes, wherein the water streams into the jacket 10 via the lower outlets 17, and is discharged through the upper outlets 17.

REFERENCE LIST

1 Electrolysis cell
1' Electrolysis cell
2 Contact electrode
2' Contact electrode
3 Contact electrode
3' Contact electrode
4 Diamond particle electrode
4' Diamond particle electrode
5 Retention frame
5a Retention frame section
5b Retaining collar
5c Longitudinal web
6 Electrical conductor
6' Electrical conductor
7 Cable
7' Cable
8 Plug
8a Opening
9 Retention clamp
9a Base section
9b Opening
9c Supporting section
10 Jacket
10a Half shell
11a Head section
11b Middle section
11'b End section
11"b Receiving section
11c Base section
12 Solar cell
14 Titanium rods
14' Titanium rods
15a to 15d Plug connection
16 Retaining element
17 Outlet
18 Separating wall
20 Spacer
21 Clamp, clips 22 Adhesive
23 Hole

What is claimed is:

1. A drop-in cell for the electrolytic purification of water, said drop-in cell comprising an electrolysis cell through which water can flow, wherein the electrolysis cell is fitted into an oblong electrically insulating casing, and wherein the electrolysis cell has two contact electrodes mutually positioned a distance apart from each other, wherein, the casing has an elongate middle portion that has a receiving portion for receiving the electrolysis cell, which elongate middle portion is free from flow through openings, wherein the casing is provided with flow through openings above and below the electrolysis cell, and wherein a head section of said drop-in cell comprises a first float portion that is positioned above the flow through openings located above the electrolysis cell and a base section of said drop-in cell comprises a second float portion below the flow through openings located below the electrolytic cell.

2. The drop-in cell according to claim 1, wherein said drop-in cell has a self-contained power supply.

3. The drop-in cell according to claim 2, wherein said drop-in cell is powered by way of a solar cell or a built-in or external battery pack.

4. The drop-in cell according to claim 1, wherein said drop-in cell is powered by way of a power grid.

5. The drop-in cell according to claim 1, wherein the first and the second float portions exhibit different buoyancies.

6. The drop-in cell according to claim 1, wherein the float portions are designed as a single piece with the casing.

7. The drop-in cell according to claim 1, wherein at least one of the first and second float portions is a hollow body shaped like a mushroom head or truncated cone.

8. The drop-in cell according to claim 1, characterized in that two faces of the electrolysis cell have secured to them plugs wherein said plugs exhibit outlets.

9. The drop-in cell according to claim 1, wherein the electrolysis cell contains at least one bipolar diamond electrode positioned between the two contact electrodes.

10. The drop-in cell according to claim 1, wherein the electrodes are spaced apart from each other by a spacer made out of an electrically insulating material.

11. The drop-in cell according to claim 10, wherein the spacer consists of a retention frame or retention frame sections, in which the longitudinal edges of the electrode(s) are inserted or held.

12. The drop-in cell according to claim 10, wherein the spacer is a thin grid consisting of an electrically insulating material or a plate or film consisting of polymeric solid electrolyte material, wherein the spacer is arranged between the electrodes so as to be in contact with said electrodes.

13. The drop-in cell according to claim 12, wherein the electrodes and spacers are assembled to yield an electrode pack by means of at least one clamp, at least one clip, or with a locally applied adhesive.

14. The drop-in cell according to claim 1, wherein the contact electrodes are designed as a grid coated with the electrode material.

15. The drop-in cell according to claim 12, characterized in that the electrodes and the spacer(s) are assembled to yield an electrode pack by means of at least one clamp, at least one clip, or with a locally applied adhesive.

16. The drop-in cell according to claim 9, wherein the bipolar diamond electrode is a diamond particle electrode.

* * * * *